(12) United States Patent
Marina et al.

(10) Patent No.: US 7,468,218 B2
(45) Date of Patent: Dec. 23, 2008

(54) COMPOSITE SOLID OXIDE FUEL CELL ANODE BASED ON CERIA AND STRONTIUM TITANATE

(75) Inventors: Olga A. Marina, Richland, WA (US); Larry R. Pederson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 602 days.

(21) Appl. No.: 10/897,521

(22) Filed: Jul. 23, 2004

(65) Prior Publication Data

US 2005/0250000 A1    Nov. 10, 2005

Related U.S. Application Data

(60) Provisional application No. 60/568,954, filed on May 7, 2004.

(51) Int. Cl.
*H01M 4/90* (2006.01)
*H01M 8/12* (2006.01)

(52) U.S. Cl. .................................. 429/40; 429/30
(58) Field of Classification Search ............... None
See application file for complete search history.

(56) References Cited

U.S. PATENT DOCUMENTS

| | | | |
|---|---|---|---|
| 4,133,778 A | 1/1979 | Gray | |
| 4,330,633 A | 5/1982 | Yoshisato et al. | |
| 4,342,704 A | 8/1982 | Hoffmann et al. | |
| 4,562,124 A | 12/1985 | Ruka | |
| 4,702,971 A | 10/1987 | Isenberg | |
| 4,849,254 A * | 7/1989 | Spengler et al. | 427/115 |
| 5,021,304 A * | 6/1991 | Ruka et al. | 429/30 |
| 5,106,706 A | 4/1992 | Singh et al. | |
| 5,108,850 A | 4/1992 | Carlson et al. | |

(Continued)

OTHER PUBLICATIONS

Yashiro, K. et al., Electrochemical Properties of Oxide Anode Materials for SOFC, Electrochemical Society Proceedings vol. 2001-16, pp. 678-683.*

(Continued)

*Primary Examiner*—Patrick Ryan
*Assistant Examiner*—Karie O'Neill
(74) *Attorney, Agent, or Firm*—Allan C. Tuan (57) ABSTRACT

An anode and method of making the same wherein the anode consists of two separate phases, one consisting of a doped strontium titanate phase and one consisting of a doped cerium oxide phase. The strontium titanate phase consists of $Sr_{1-x}M_xTiO_{3-\delta}$, where M is either yttrium (Y), scandium (Sc), or lanthanum (La), where "x" may vary typically from about 0.01 to about 0.5, and where δ is indicative of some degree of oxygen non-stoichiometry. A small quantity of cerium may also substitute for titanium in the strontium titanate lattice. The cerium oxide consists of $N_yCe_{1-y}O_{2-\delta}$, where N is either niobium (Nb), vanadium (V), antimony (Sb) or tantalum (Ta) and where "y" may vary typically from about 0.001 to about 0.1 and wherein the ratio of Ti in said first phase to the sum of Ce and N in the second phase is between about 0.2 to about 0.75. Small quantities of strontium, yttrium, and/or lanthanum may additionally substitute into the cerium oxide lattice. The combination of these two phases results in better performance than either phase used separately as an anode for solid oxide fuel cell or other electrochemical device.

5 Claims, 6 Drawing Sheets

U.S. PATENT DOCUMENTS

| | | | |
|---|---|---|---|
| 5,474,800 | A | 12/1995 | Matsuzaki |
| 5,509,189 | A | 4/1996 | Tuller et al. |
| 5,516,597 | A | 5/1996 | Singh et al. |
| 5,686,198 | A | 11/1997 | Kuo et al. |
| 5,759,936 | A | 6/1998 | Christiansen et al. |
| 5,807,642 | A | 9/1998 | Xue et al. |
| 5,932,146 | A | 8/1999 | Kuo et al. |
| 5,993,986 | A | 11/1999 | Wallin et al. |
| 6,120,924 | A | 9/2000 | Chiba et al. |
| 6,248,468 | B1 | 6/2001 | Ruka et al. |
| 6,589,680 | B1 | 7/2003 | Gorte et al. |

OTHER PUBLICATIONS

Balachandran, U, et al., Electrical Conductivity in Lanthanum-Doped Strontium Titanate, J. Electrochem. Soc, vol. 120 #5, May 1982, pp. 1021-1026.

Balachandran U, et al., Self-Compensation in Lanthanum-Doped Strontium Titanate, Journal of Solid State Chemistry 40, pp. 85-91 (1981).

Chan, N.H., et al., Nonstoichiometry in SrTiO, J. Electrochem. Soc., Aug. 1981, pp. 1762-1769.

Flandermeyer, B.F., et al., Oxidation-reduction behaviour of La-doped SrTiO3, Journal of Materials Science 19 (1984) pp. 2593-2598.

Hanajiri, Y., et al. EXAFS Analyses of CaTiO Doped with C3, Nd and U, Solid State Ionics 108, (1998) pp. 343-348.

Jurado, J.R., et al., Impedance Spectroscopy of Sr 0.97 Ti 1-x Fe xO3-8 materials with moderate.

Kutty, T.R.N, et al. Low voltage varistors based on SrTiO3 ceramics, Materials Science and Engineering B33, (1995) pp. 58-66.

Middleton, P.H., et al. Evaluation of Novel Oxide Anodes for Methane Conversion in SOFC Systems, Proceedings of the 3rd Sym. Solid State Oxide Fuel Cells, 1993 vol. 93-4, 542-551.

Pudmich, et al. Chromite/titanate based perovskites for application as anodes in solid oxide fuel cells, Solid State Ionics 135, (2000) 433-438.

Slater, P.R., Niobium based tetragonal tungsten bronzes as potential anodes for Solid oxide fuel cells: synthesis & electriacal characterisation 120 (1999) 125-134.

Balachandran, U., et al., Electrical Conductivity in Strontium Titanate, Journal of Solid State Chemistry, 1981, vol. 39, pp. 351-359.

Tufte, O.N., et al., Electron Mobility in Semiconducting Strontium Titanate, Physical Review, Mar. 15, 1967, vol. 155#3, pp. 796-802.

Frederikse, H.P.R., et al., Electronic Transport in Strontium Titanate, Physical Review, Apr. 20, 1964, vol. 134 #2A, pp. A442-A445.

Mims, Charles A., et al., LaCr 1-x NixO3 Perovskites: Oxygen Mobility and Methane Reactivity, Electrochemical Proceedings vol. 97-18, pp. 737-745.

Baker, R.T. et al., Ionic and Electronic Conduction in Fe and Cr Doped (La,Sr)Gao3-8, J. Electrochem. Soc., vol. 144 #9, pp. 3130-3135.

Kaiser, A., et al., Novel Highly Titania Doped YSZ Anodes for SOFCs, Electrochemical Society Proceedings vol. 99-19, pp. 541-548.

Watanabe, M., et al., Effect of Ionic Conductivity of Zirconia Electrolytes on the Plaratization Behavior of Ceria-Based Anodes ..., J. Electrochem Soc., V 144 pp. 1739-1743.

Naik, I.K., et al., Electrical Conduction in Nb2O5-Doped Cerium Dioxide, J. Electrochem Soc, Apr. 1979, pp. 562-566.

Mogensen, M, et al., Physical Properties of Mixed Conductor Solid Oxide Fuel Cell Anodes of Doped CeO2, J. Electrochem. Soc. vol. 141 #8, Aug. 1994, pp. 2122-2128.

Marina, O.A., et al., Ceria-Based Anodes on a YSZ Electrolyte: Preparation & Electrochemical Performance, Electrochemical Proceedings vol. 97-18, pp. 540-548.

Slater, P.R., Synthesis and electrical characterisation of new anode materials for SOFCs, Proceedings from 3rd European Solid Oxide Fuel cell Forum, Jun. 1998, vol. 1, pp. 416-426.

Sugimoto, W. et al., Synthesis and structures of carrier doped titanates with the Ruddlesden-Popper structure (Sr0.95La0.05)n+1TinO3n+1..Solid State ionics 108 (1998) 315-319.

Sumathi, R., et al., Selective oxidation and dehydrogenation of benzyl alcohol on ABB'O3 (A=Ba,B=Pb,Ce, Ti and B'=Bi,Cu, Sb) ..., Applied Catalysis A:General 172, (1998) pp. 15-22.

Sutija, D. et al., AC van der Pauw Measurements of the Electical Conductivity of Iron-doped ..., Proceedings 3rd Symposium on Solid Oxide Fuel Cells, vol. 93-4, 552-561 (1993).

Sutija, D. et al. AC van der Pauw Measurements of the Electrical Conductivity of Iron-doped Calcium Titanate, Proceedings of the 3rd International Symposium on Solid Oxide.

Yahia, J., et al., Electrical Conduction in p-Type Titanium Sesquioxide, Physical Review, vol. 123 #4, Aug. 1961, pp. 1257-1261.

Atkinson, A., et al., Advanced anodes for high-temperature fuel cells, Nature materials, vol. 3, Jan. 2004.

Zhang, et al., Doped strontium titanate current liquid and preparation method, XP-002146552, 1998 (1 page).

Yamamoto, O., et al., Perovskite-type as Oxygen Electrodes for High Temperature Oxide Fuel Cells, XP009020586-Solid State Ionics 22 (1987) 241-246.

Pudmich, G., et al., Characterizatin of New Ceramic Anode Materials for Direct Methane Oxidation in SOFC, XP000938065, Electrochemical Soc Proceedings vol. 99-19, pp. 577-582.

Slater, P.R., et al., Synthesis and electrical characterisation of doped perovskite titanates as potential anode mat'ls for solid oxide fuel cells, J. Mater Chem 1997 2495-2498.

Sunstrom, J.E., et al., Synthesis Structure, and Properties of La1-xSrxTiO3(0<x<1),Chemistry of Materials, 1992, 4, pp. 346-353.

* cited by examiner

COMPOSITE SOLID OXIDE FUEL CELL ANODE BASED ON CERIA AND STRONTIUM TITANATE

REFERENCE TO RELATED APPLICATIONS

This application claims the benefit of U.S. Provisional Application Ser. No. 60/568,954 filed May 7, 2004, titled Novel Ceria Based SOFC Anode with Increased Conductivity, the disclosure of which is hereby incorporated by reference.

STATEMENT OF GOVERNMENT SUPPORT

This invention was made with United States Government support under Contract DE-AC06-76RL01830 awarded by the U.S. Department of Energy. The United States Government has certain rights in the invention.

BACKGROUND OF THE INVENTION

The present invention relates to novel oxide anode materials and method of making the same. There is substantial interest from both the Government and Industry in identifying materials for Solid Oxide Fuel Cell (SOFC) anodes. The materials used as an SOFC anode must possess a high electronic conductivity or preferably mixed ionic and electronic conductivity. It is well known that the materials must exhibit sufficient catalytic activity towards the reaction proceeding on the electrode surface to minimize polarization losses. Also necessary are adequate porosity for gas transport, and good chemical and mechanical compatibility with the electrolyte and interconnect. Moreover, the anode must be thermally stable over a wide range of temperatures.

Another desirable feature is that an anode should be stable over a rather wide range of oxygen partial pressures, such as for example, in a low oxygen partial pressure prevalent in the fuel gas inlet as well as in the more oxidizing conditions at the fuel outlet. Furthermore, if the SOFC is to operate on unreformed hydrocarbons, the anode should also possess a high catalytic activity for hydrocarbon oxidation without carbon deposition.

As background to this invention, fuel cell devices are known and used for the direct production of electricity from standard fuel materials including fossil fuels, hydrogen, and the like by converting chemical energy of a fuel into electrical energy. Fuel cells typically include a porous anode, a porous cathode, and a solid or liquid electrolyte therebetween. In operation, gaseous fuel materials are contacted, typically as a continuous stream, with the anode (also referred to as the "fuel electrode" of the fuel cell system, while an oxidizing gas, for example air or oxygen, is allowed to pass in contact with the cathode (also referred to as the "air electrode") of the system. Electrical energy is produced by electrochemical combination of the fuel with the oxidant. Because the fuel cells convert the chemical energy of the fuel directly into electricity without the intermediate thermal and mechanical energy step, their efficiency is substantially higher than that of conventional methods of power generation.

In a typical SOFC, a solid electrolyte separates the porous metal-based anode from a porous metal or ceramic cathode. Due to its mechanical, electrical, chemical and thermal characteristics, yttria-stablized zirconium oxide (YSZ) is currently the electrolyte material most commonly employed. Currently, the anode in a typical SOFC is made of nickel-YSZ cermet, and the cathode is typically made of doped lanthanum manganites, lanthanum ferrites or lanthanum cobaltites. In such a fuel cell, the fuel flowing to the anode reacts with oxide ions to produce electrons and water. The oxygen reacts with the electrons on the cathode surface to form oxide ions that migrate through the electrolyte to the anode. The electrons flow from the anode through an external circuit and then to the cathode. The movement of oxygen ions through the electrolyte maintains overall electrical charge balance, and the flow of electrons in the external circuit provides useful power. Typical SOFC operate at high temperatures, 650-1000° C. This allows flexibility in fuel choice and results in suitable fuel-to-electricity and thermal efficiencies; however, high temperatures impose stringent requirements on the materials selections for other components of the fuel cell or fuel cell assembly.

U.S. patent application Ser. No. 10/427,866 filed May 1, 2003 (Cerium-Modified Doped Strontium Titanate Compositions for Solid Oxide Fuel Cell Anodes and Electrodes For Other Electrochemical Devices) discloses novel oxide electrode materials comprising of a doped cerium oxide phase and a doped titanium oxide phase and methods for making and using the same and all embodiments and disclosure is hereby incorporated into the present by reference.

For solid oxide fuel cell (SOFC) applications requiring anode stability in oxidizing and sulfur containing atmospheres, doped titanates and doped ceria have been considered as potential candidate materials In particular, samaria- and gadolinia-doped ceria are known to be good electrocatalysts for hydrogen oxidation. Moreover, they are less susceptible to carbon deposition in hydrocarbons than traditional nickel-zirconia anodes for solid oxide fuel cells (Marina, Bagger et al. 1999; Marina and Mogensen 1999). However, doped cerias typically exhibit low electronic conductivity that limits their suitability for anode-supported SOFCs. Donor doping results in increased electronic conductivity compared to pure or acceptor-doped ceria In view of the above background, it is apparent that there is a continuing need for further developments in the field of SOFC technology. In particular, there is a need for further advancement in the development of alternative anode materials having suitable properties for use in advanced SOFC designs. There is also a need for further advancement in the development of other alternatives electrochemical devices, such as, for example, electrolyzers, electrochemical sensors and the like. The present invention addresses these needs, and further provides related advantages.

SUMMARY OF THE INVENTION

The present invention solves the above problems and needs by providing fuel cell anodes that exhibit improved stability in oxidizing and sulfur containing atmospheres compared to traditional anodes. The novel anodes consist of two separate phases, one consisting of a doped strontium titanate phase and one consisting of a doped cerium oxide phase. The strontium titanate phase consists of $Sr_{1-x}M_xTiO_{3-\delta}$, where M is either yttrium (Y), scandium (Sc), or lanthanum (La), where "x" may vary typically from about 0.01 to about 0.5, and where $\delta$ is indicative of some degree of oxygen non-stoichiometry. A small quantity of cerium may also substitute for titanium in the strontium titanate lattice. The cerium oxide consists of $N_yCe_{1-y}O_{2-\delta}$, where N is either niobium (Nb), vanadium (V), antimony (Sb) or tantalum (Ta) and where "y" may vary typically from about 0.001 to about 0.1 and wherein the ratio of Ti in said first phase to the sum of Ce and N in the second phase is between about 0.2 to about 0.75. Small quantities of strontium, yttrium, and/or lanthanum may additionally substitute into the cerium oxide lattice. The combination of these two phases results in better performance than either phase used separately as a solid oxide fuel cell anode. The strontium titanate phase is the more electronically conductive of the two, but generally provides inadequate electrocatalytic activity for use as the anode in a solid oxide fuel cell. Cerium oxide and doped cerium oxide are often employed in hydrocarbon oxidation, though the electronic conductivity is inadequate to enable the use of this material as the anode in solid oxide fuel cell designs where the thickness of the anode layer is more than 50 µm. The electronic conductivity of ceria may be increased by donor doping, for example, with niobium or tantalum, though such additions are not sufficient to give acceptably high electronic conductivity for use as an electrode. The invention discloses that a composite electrode composing percolating mixtures of doped strontium titanate and donor-doped cerium oxide provides a higher electrocatalytic activity than is expected based on the properties of the individual phases.

DESCRIPTION OF THE PREFERRED EMBODIMENTS

For the purpose of promoting an understanding of the principles of the invention, reference will now be made to preferred embodiments and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

The present invention provides novel compositions that find advantageous use in making fuel electrode materials for solid oxide electrochemical devices such as, for example, electrodes for electrolyzers, electrodes for electrochemical sensors and anodes for solid oxide fuel cells. This invention contemplates using a fuel electrode as an anode when electrons are produced or as a cathode where the electrons are used. The invention also provides novel methods for making fuel electrodes for electrochemical devices and electrochemical devices and assemblies having electrodes comprising inventive compositions. The invention is described herein primarily by reference to solid oxide fuel cell technology, and a variety of examples are provided herein showing advantage features and characteristics of the invention in relation to SOFC technology; however, it is not intended that the invention be limited to use in connection with SOFC devices.

It is well known to a person of ordinary skill in the relevant field that a SOFC can have a wide variety of configurations, including, for example and without limitations, a planar (also referred to as "flat plate") configuration, tubular configuration and a corrugated configuration. It is to be understood that SOFC anode materials provided by the present invention can be advantageously used in a wide variety of SOFC configurations, and such are within the scope of this invention.

In one aspect, the invention provides an anode in a solid oxide fuel cell comprising a two-phase mixture having a first phase of doped strontium titanate of the general formula $Sr_{1-x}M_xTiO_{3-\delta}$, where M is selected from a group comprising of yttrium, scandium, or lanthanum, where "x" may vary typically from about 0.01 to about 0.5, and where δ is indicative of some degree of oxygen non-stoichiometry; and a second phase of donor-doped cerium oxide of the general formula $N_yCe_{1-y}O_{2-\delta}$, where N is either niobium (Nb) vanadium (V), antimony (Sb) or tantalum (Ta) and combinations thereof; and where "y" may vary typically from about 0.001 to about 0.1 and wherein the ratio of Ti in said first phase to the sum of Ce and N in the second phase is between about 0.2 to about 0.75. The anode may have the two phases form percolating networks through the anode layer. Small quantities of strontium, yttrium, and/or lanthanum may additionally substitute into the cerium oxide lattice.

In another preferred embodiment, the electrocatalytic properties of the two-phase mixture exceeds the electrocatalytic properties of either the first phase or the second phase individually.

In still another preferred embodiment, the cerium oxide in the anode can be doped with a pentavalent cation.

It is also contemplated by this invention of having a first phase doped strontium titanate further comprising of a metal such as nickel, cobalt, copper, chromium or iron. This invention further contemplates a solid oxide fuel cell having a layer of ceramic ion conducting electrolyte defining a first and second opposing surfaces; a conductive anode layer in contract with the first surface of the electrolyte layer; a conductive cathode layer in contract with the second surface of the electrolyte layer wherein the electrolyte layer is disposed between the anode layer and the cathode layer. In this embodiment, the anode layer may further comprises a two-phase mixture having a first phase of doped strontium titanate material of the general formula $Sr_{1-x}M_xTiO_{3-\delta}$, where M is selected from a group comprising of yttrium, scandium, or lanthanum, where "x" may vary typically from about 0.01 to about 0.5 where δ is indicative of some degree of oxygen non-stoichiometry; and a second phase of donor-doped cerium oxide of the general formula $N_yCe_{1-y}O_{2-\delta}$, where N is either niobium (Nb) vanadium (V), antimony (Sb) or tantalum (Ta) and combinations thereof; and where "y" may vary typically from about 0.001 to about 0.1 and wherein the ratio of Ti in said first phase to the sum of Ce and N in the second phase is between about 0.2 to about 0.75. The anode layer within SOFC may further form percolating networks through the anode layer. Still further the SOFC may have an anode layer wherein the electrocatalytic properties of the anode layer of the two-phase mixture exceed the electrocatalytic properties of the first phase and second phase individually.

In a another embodiment, the fuel cell may be either planar fuel cell or incorporated in a stack assembly including a plurality of solid oxide fuel cells.

In yet another embodiment, the doped strontium titanate material comprises at least about 25% of the anode, measured by thickness, by volume percent or by mass percent. In certain preferred embodiments, the doped strontium titanate material is in direct contact with the electrolyte. The doped strontium titanate composition of wide variety of formulas in accordance with this invention can be made by providing a mixture, preferably a homogenous mixture, of strontium titanate and one or more transition metals or other dopants for making a strontium titanate composition described herein.

This invention can also be used as a cathode for other types of electrochemical devices, such as cathode in an electrolyzer.

The ceria comprises a fluorite-type structure. The term "dopant" as used herein refers to a substance that is included in the chemical structure of the strontium titanate and cerium oxide. As used herein, the term "cerium modified" means a composite comprising of at least two phases—a strontium titanate phase and a ceria phase wherein there can exist a potential for some substitution of cerium into the titanate phase as well as some lanthanum and strontium into the ceria phase. As used herein, the term "cerium-modified" is intended to mean that the doped strontium titanate composition has cerium included therein in some form. For the purpose of describing the present invention, the term "cerium-modified doped strontium titanate" is intended to encompass doped strontium titanate compositions modified by the addition of cerium irrespective of the location of the cerium in the composition.

For the purpose of describing the invention, the amount of cerium included in an inventive composition is described in terms of atomic percent (at. %), which is designated herein by the variable "y". The term "atomic percent" as used herein refers to the atomic ratio of cerium in the composition of titanium atoms present in the composition. As described in the Examples, inventive compositions can be made by glycine/nitrate combustion method, or can alternatively be made using other methods as would occur to a person of ordinary skill in the art, such as, for example, the Pechini method.

In a further preferred embodiment, the doped strontium titanate material can have a thickness of at least 3 microns. In another embodiment, the material is ground to an average particle size of 0.5 microns or less. Still in another preferred embodiment, the material is larger in the range of 5 microns to about 10 microns. It is also a preferred embodiment to have the material comprise essentially the entire anode layer.

In other embodiments, the anode can include a combination of doped strontium titanate and a second material, such as, for example, an additional conducting material or the like. In one embodiment, the respective materials are formed into discreet sublayers to form the anode layer. For example, the anode can be formed by placing a sublayer of the doped strontium titanate and donor-doped cerium oxide material on a material that is adjacent to a solid oxide electrolyte and then forming a second layer of a second material over the doped strontium titanate and donor-doped cerium oxide material.

In another preferred embodiments the anode can act as an electrode for an electrochemical device, the electrode comprising a cerium-modified doped strontium titanate material, the material including a A-site dopant selected from a group consisting of lanthanum, scandium, yttrium and combinations thereof; and wherein cerium present in the cerium oxide is doped with a pentavalent cation in an amount of at least about 0.1 percent. The electrode can be an electrochemical device that is selected from the group consisting of a solid oxide fuel cell, an electrolyzer, an electrochemical pump and an electrochemical sensor. The manner of making an electrochemical cell, an anode substrate is independently formed, for example, by tape casting, tape calendaring or other method that would occur to a person of ordinary skill in the art, and an electrolyte layer is applied to the anode substrate, such as, for example, by painting, spraying, dip coating, sputtering or sedimentation. With respect to anode-supported cell embodiments, in one embodiment, the anode layer has a thickness of at least about 50 microns to about 1 mm. The electrolyte layer can have a wide variety of thicknesses, ranging, for example, from about 1 micron to about 500 microns. In one preferred embodiment, the electrolyte layer has a thickness of from about 1 to about 20 microns.

In a still further embodiment of this invention a solid oxide fuel cell anode is made by providing a two-phase mixture having a first phase of doped strontium titanate material of the general formula $Sr_{1-x}M_xTiO_{3-\delta}$, where M is selected from a group comprising of yttrium, scandium, or lanthanum, and combinations thereof; wherein x may vary typically from 0.01 to 0.5, and wherein $\delta$ is where $\delta$ is indicative of some degree of oxygen non-stoichiometry; and combining a second phase of donor-doped cerium oxide of the general formula $N_yCe_{1-y}O_{2-\delta}$, where N is either niobium (Nb), vanadium (V), antimony (Sb) or tantalum (Ta), and combinations thereof; and where "y" may vary typically from 0.001 to 0.1 and wherein the ratio of Ti in said first phase to the sum of Ce and N in the second phase is between about 0.2 to about 0.75. The doped strontium titanate is in contact with the electrolyte layer. The anode in a solid oxide fuel cell may have a layer of doped strontium titanate having a thickness of at least 3 microns. Still further the anode may have a layer of doped strontium titanate material having a thickness from about at least about 5 microns to about at least 10 microns. In another embodiment the doped strontium titanate material may comprise essentially the entire anode. Still further the anode may comprise a substantially homogenous mixture of doped strontium titanate material and a second material.

EXAMPLES

General Experimental Set-up

For use in the experiments herein, the oxide powders were prepared by glycine/nitrate combustion synthesis using a stoichiometric fuel/oxidant ratio, if the mixture is to too far off stoichiometry, the excess hydrocarbons or nitrates will need to burned off, powder calcinations at 700°-1000° C. for about 2 hours. Doped ceria compositions containing various amounts of dopant were synthesized. Cerium in $CeO_2$ was partially substituted with niobium $Ce_{1-y}Nb_yO_2$, y=0.01, 0.02, 0.05, and 0.1. Small amounts of powders were calcined at different temperatures to determine the minimal temperature ensuring a single-phase composition for each powder. The phase composition was confirmed by x-ray diffraction using Philips XRG 3100 Automated X-ray Diffraction System. Next, bars for dilatometry and electrical conductivity measurements were isostatically pressed and sintered under empirically-determined conditions to obtain the maximum density of the samples. The calcinations and sintering temperatures for samples sintered in air are listed in Table 1.

TABLE 1

Properties and preparation details of $Ce_{1-y}Nb_yO_2$

| Dopant amount (y) | 0.01 | 0.02 | 0.05 | 0.1 |
|---|---|---|---|---|
| Calcination temperature, ° C./hour | 1000/1 h | 1000/1 h | 1000/1 h | 1000/1 h |
| Sintering temperature, ° C./hour | 1400/8 h | 1400/8 h | 1400/8 h | 1400/8 h |

TABLE 1-continued

Properties and preparation details of $Ce_{1-y}Nb_yO_2$

| Impurities in $CeO_2$ phase | none | none | none | $CeNbO_4$ (<8 vol %) |
|---|---|---|---|---|
| % of Theoretical Density | 96.9 | 96.7 | 96.6 | 93.8 |

The thermal expansion was studied in a dilatometer as a function of temperature and oxygen partial pressure ($pO_2$). Dimensional changes were monitored in the $pO_2$ range $1-10^{-18}$ atm at 1000° C. and 800° C. to determine linear thermal expansion, chemical expansion, sintering behavior, and phase transformations. XRD analysis was performed to determine phase composition as a function of calcination temperature. Electrical conductivity of the sintered bars was measured in oxidizing and reducing atmospheres by a standard dc four-probe conductivity technique.

Oxide powders were attrition milled to reduce the average particles size to approximately 0.5 μm. The standard attrition milling procedure included powder milling with media for 5 minutes at 550 rpm, sampling and checking the particle size. If the average particle size was larger than desired, the powder would be attrition milled until the desired particle size of 0.5 microns was reached. Finally, the powder would be removed from the mill, dried, and run through a 325 mesh screen. Electrode inks were prepared by mixing the anode powder with a binder followed by screen-printing a circular pattern onto a sinted at 1450° C. YSZ disc to deposit electrodes. An internal, Luggin-type reference electrode was used, consisting of a Pt reference wire placed in a blind hole drilled half-way through the YSZ disc. A platinum paste auxiliary electrode was screen-printed on the same side with the reference. The pellet was sealed between the alumina tubes by gold rings.

All experiments were performed at atmospheric pressure in the temperature range 550-950° C. The temperature was monitored by two thermocouples placed at the opposite sides of the YSZ disc. A mixture of hydrogen and nitrogen or hydrogen and argon was saturated with water at 25-95° C. and introduced into the working electrode compartment. Complex impedance spectra were acquired using a Solartron 1280 frequency response analyser coupled with a Solartron 1287 electrochemical interface over a frequency range from 10 μHz to 100 kHz. The polarization resistances of the electrodes were determined as the difference between the low- and high-frequency intercepts on the X-axis.

When the amount of $Nb_2O_5$ in the ceria was less than 10 at %, the doped ceria was present in a fluorite type structure similar to $CeO_2$. When 10 at % or more of $Nb_2O_5$ was added to the ceria, the formation of the second phase, $CeNbO_4$, was also observed, see Table 1. Thus, to prevent second phase formation the amount of $Nb_2O_5$ dopant should not exceed 10 at %.

Figure 1:
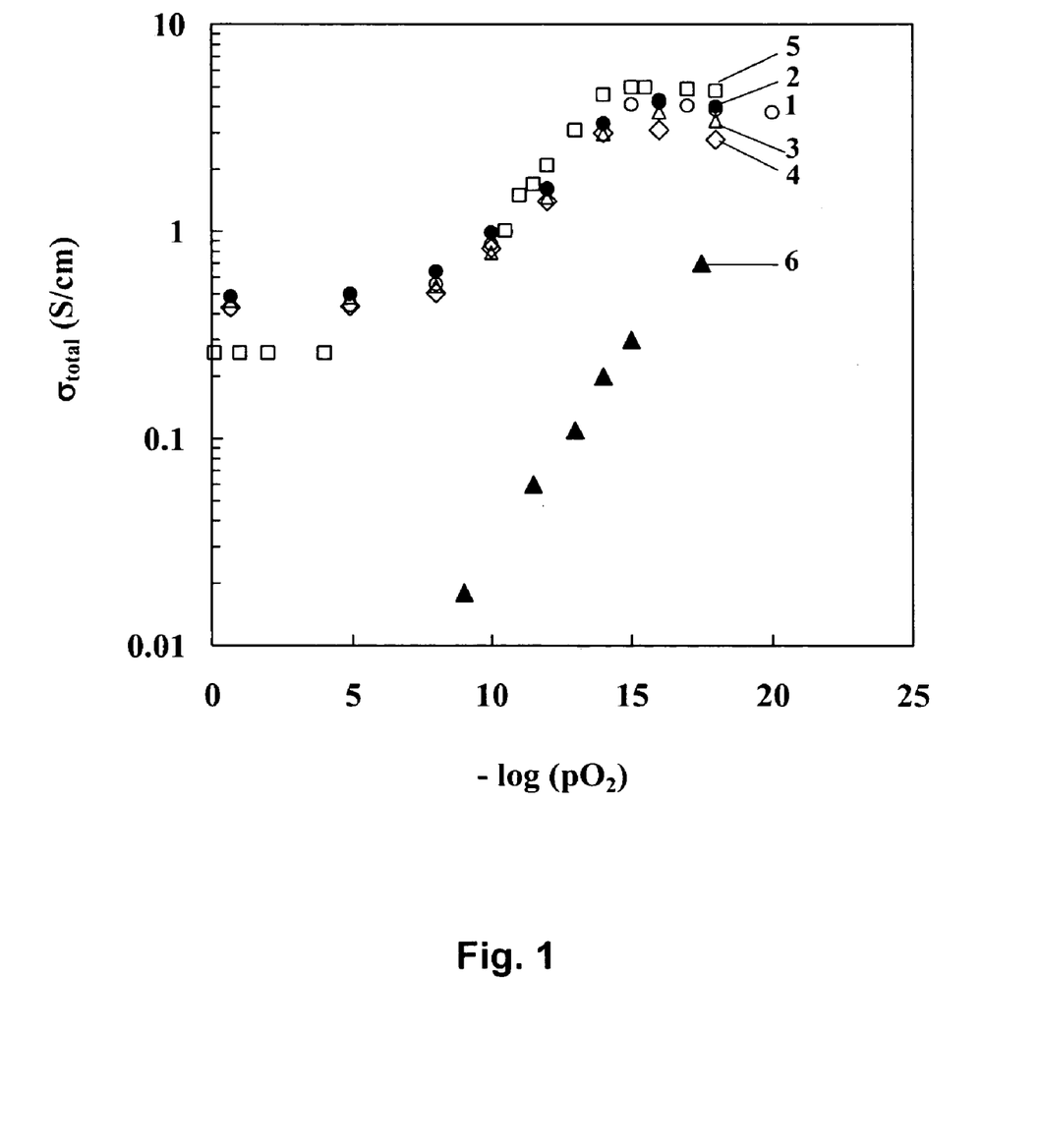
FIG. 1 is a plot showing the effect of oxygen partial pressure ($pO_2$) on the total conductivity, of $Ce_{1-y}Nb_yO_{2-\delta}$.

FIG. 1 shows the electrical conductivity, σ, of niobia-doped ceria, $Ce_{1-y}Nb_yO_{2-\delta}$ (y=0.001-0.1) and gadolinia-doped ceria as a function of oxygen partial pressure. It is seen that for all of the compositions the conductivity increases as the oxygen partial pressure decreases. Under the experimental conditions similar to those the fuel electrode would experience in the SOFC during operation, the conductivity of the niobia-doped ceria is around 5 S/cm that is an order of magnitude higher than the conductivity of the gadolinia-doped ceria. Therefore, doping ceria with pentavalent elements is favorable to increase the conductivity of the ceria phase.

The conductivity of the titanate/ceria composites was studied as a function of temperature during heating to 1000° C. Increase in the electrical conductivity was observed with increasing the temperature. For relatively low ceria additions, the high temperature behavior was similar to that of the La-doped $SrTiO_3$, with a general trend towards lower conductivity with increasing the ceria phase content. The decreasing in conductivity can be attributed to the fact that the ceria has a lower conductivity than the doped titanate. For the high cerium compositions the conductivity decreased substantially as the lower conductivity ceria phase became the dominant phase in the two phase mixture. For the compositions high in cerium oxide, for example, titanate/ceria=1:1, the conductivity was lower than that for the compositions low in ceria (titanate/ceria=1/0.1). As noted above, the reduction in conductivity with increasing cerium content is apparently due to the inherently lower conductivity of the doped ceria than that of the lanthanum-doped titanate. Electrical conductivity increased when oxygen partial pressure was lower at 1000° C.

The thermal expansion behavior of pentavalent element doped cerias and titanate/ceria composites was studied in the temperature range of 50-1000° C. The average thermal expansion coefficients were between $10.5-12\times10^{-6}$ $K^{-1}$. The thermal expansions of YSZ and samaria-doped ceria (SDC) electrolytes are known to be around 10.5 and 12 ($\times 10^{-6}$ $K^{-1}$), respectively.

The effect of varying oxygen partial pressure on the dimensional stability of the niobia- and tantalia-doped ceria was studied at T=1000° C. The measurements began in air and were finished at $pO_2=10^{-18}$ atm. A relative expansion, $\Delta L/L_o$, 1-2% was observed for all of the cerias. However, when doped ceria was pre-mixed with the titanate into the composite, the expansion less than 0.1-0.2% was observed for all of the compositions. It is known that the titanate perovskite exhibits significant dimensional stability over a wide range of $pO_2$, the ceria is known to expand significantly in reducing atmospheres. Thus, to suppress the expansion of the ceria and maximize the dimensional stability of the composites, the composites should contain only the minimum amount of ceria required to optimize the electrocatalytic activity for fuel oxidation.

Cells with titanate/ceria anodes sustained several full redox cycles without degradation and were not susceptible to carbon deposition in hydrocarbons.

Figure 2:
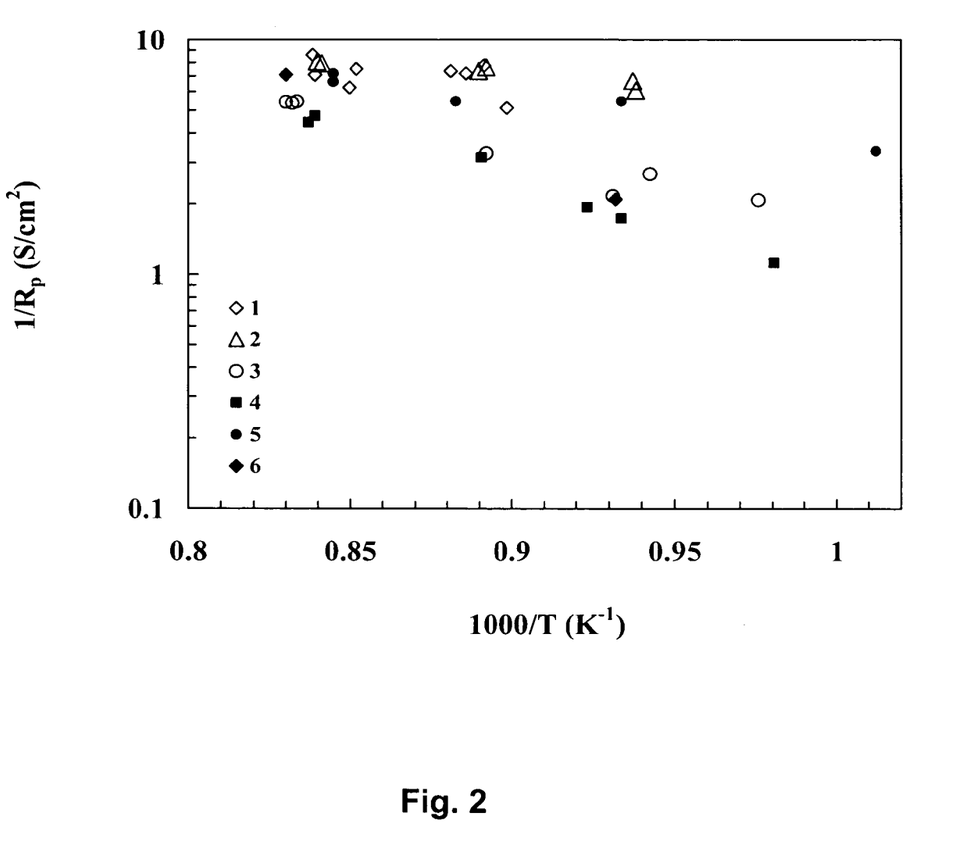
FIG. 2 is a plot showing the effect of temperature on the inverse polarization resistance of doped ceria electrode in wet hydrogen ($H_2/H_2O=97/3$) vs. Pt/air.

The electrocatalytic properties of the $Nb_2O_5$— and $Ta_2O_5$— doped cerias is shown in FIG. 2. The properties of $Sm_2O_3$ and $Gd_2O_3$ dopants is given in the same figure as well. As seen, the $Nb_2O_5$ and $Ta_2O_5$ dopants exhibit higher activity for hydrogen oxidation (higher conductance) compared to $Sm_2O_3$ and $Gd_2O_3$ dopants. Increasing $M^{5+}$ dopant amount from 1 to 10 at % decreases the electrode performance, most likely, due to the second phase formation.

Figure 3:
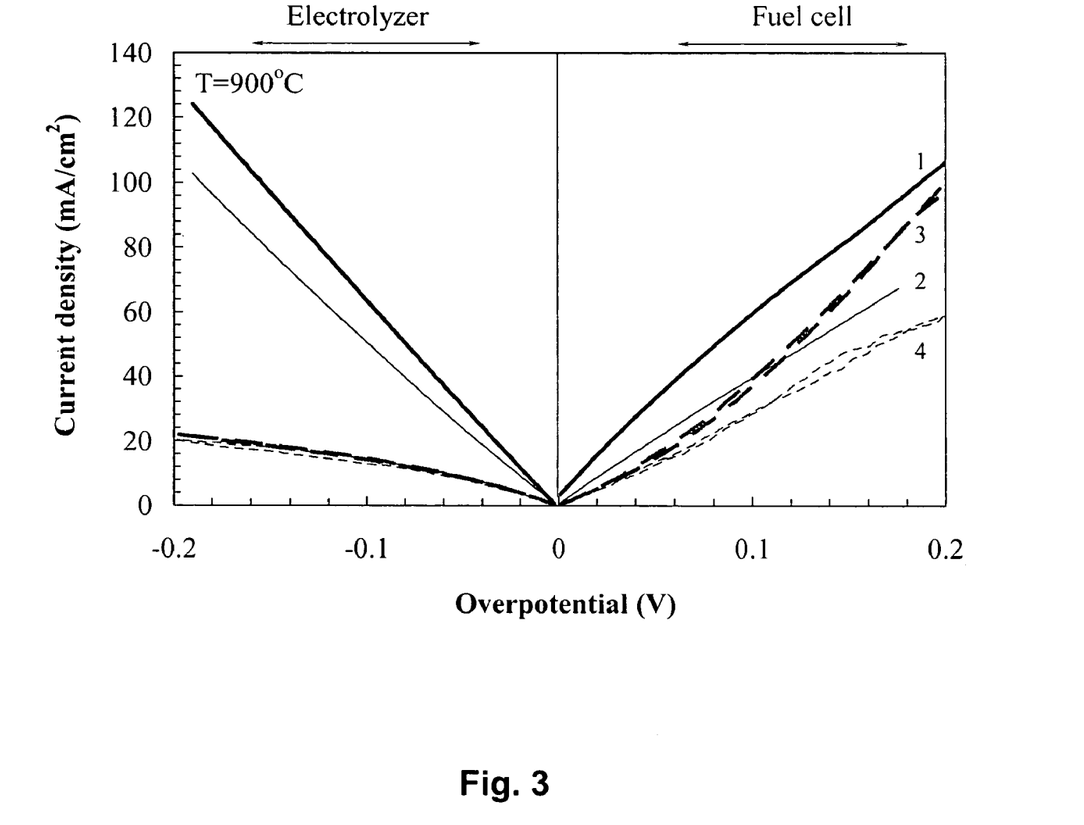
FIG. 3 is a plot showing current-potential characteristics obtained on a ceramic composite $La_{0.35}Sr_{0.65}TiO_3 + Ce_{0.98}Ta_{0.02}O_{2-\delta}$ and standard Ni—YSZ anodes at 900° C. in $H_2/H_2O/N_2=2.7/3/94.3$ and $H_2/H_2O/N_2=20/2.2/77.8$.

FIG. 3 shows current-potential characteristics obtained on Ni—YSZ and titanate/ceria composite electrodes at 900° C. at a steam-to-hydrogen ratio of around 1. As seen, under these experimental conditions the titanate/ceria electrode performs better than state-of-art Ni/YSZ in both the fuel cell and electrolysis modes. The difference was more significant for the electrolysis mode. When operated as an electrolyzer at 900° C. in a mixture of 2.7 percent hydrogen, 3 percent water, and balance nitrogen, an electrode composed of $La_{0.35}Sr_{0.65}TiO_3$—$Ce_{0.98}Ta_{0.02}O_{2-\delta}$ (titanate/ceria=7:3) showed an area specific resistance of 1.6 ohms-$cm^2$ at a constant polarization loss of 0.1 V. The Ni/YSZ electrode gave an area specific resistance of 5.8 ohms-$cm^2$ for the same polarization loss under identical conditions.

An increase in the water partial pressure resulted in increased polarization losses for both the titanate/ceria and Ni/YSZ electrodes in both electrolyzer and fuel cell modes, also shown in FIG. 3. In a mixture of 2.2 percent hydrogen, 20 percent water, and balance nitrogen, the area specific resistance of the titanate/ceria composite electrode was 2.0 ohms-cm$^2$ in the electrolyzer mode and 2.5 ohms-cm$^2$ in the fuel cell mode, for a constant polarization loss of 0.1 V. For the Ni/YSZ composite electrode, area specific resistances were 6.1 ohms-cm$^2$ in the electrolyzer mode and 3.5 ohms-cm$^2$ in the fuel cell mode.

Figure 4:
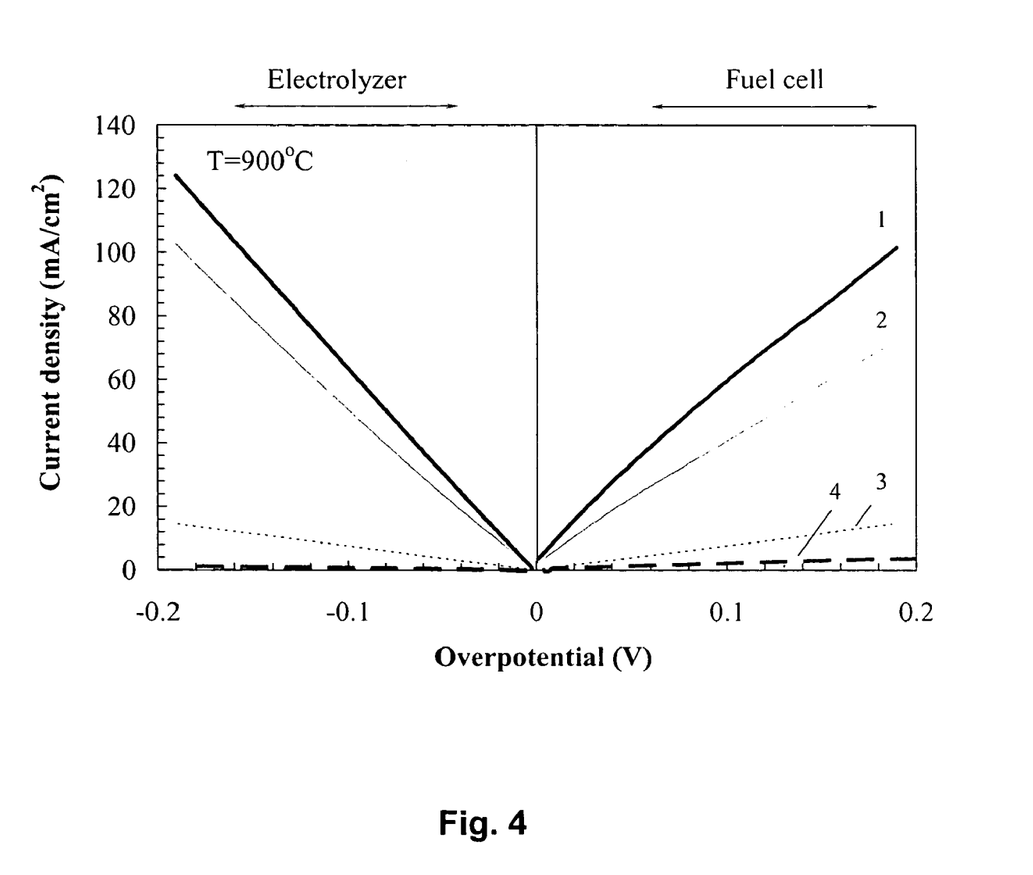
FIG. 4 is a plot showing current-overpotential dependencies obtained on a ceramic composite anode $La_{0.35}Sr_{0.65}TiO_3 + Ce_{0.98}Ta_{0.02}O_{2-\delta}$ at 900° C. while varying the steam partial pressure.

Electrode performance was affected by increases in the water partial pressure when operated as an electrolyzer than as a fuel cell. FIG. 4 gives current-overpotential dependencies obtained for a titanate/ceria composite electrode ($La_{0.35}Sr_{0.65}TiO_3$—$Ce_{0.98}Ta_{0.02}O_{2-\delta}$ in a 7:3 ratio) at 900° C. for water partial pressures ranging from 3 to 80 percent. When considering a constant polarization loss of 0.1 V, area specific resistances in the electrolysis mode were 1.6, 2.0, 15, and 100 ohms-cm$^2$ for water partial pressures of 0.03, 0.20, 0.40, and 0.80 atm., respectively. When operating as a fuel cell at the same polarization loss, area specific resistances were 1.7, 2.5, 13, and 50 ohms-cm$^2$, respectively. The hydrogen partial pressure was decreased somewhat as the steam partial pressure increased, which may partially account for observed trends.

Figure 5:
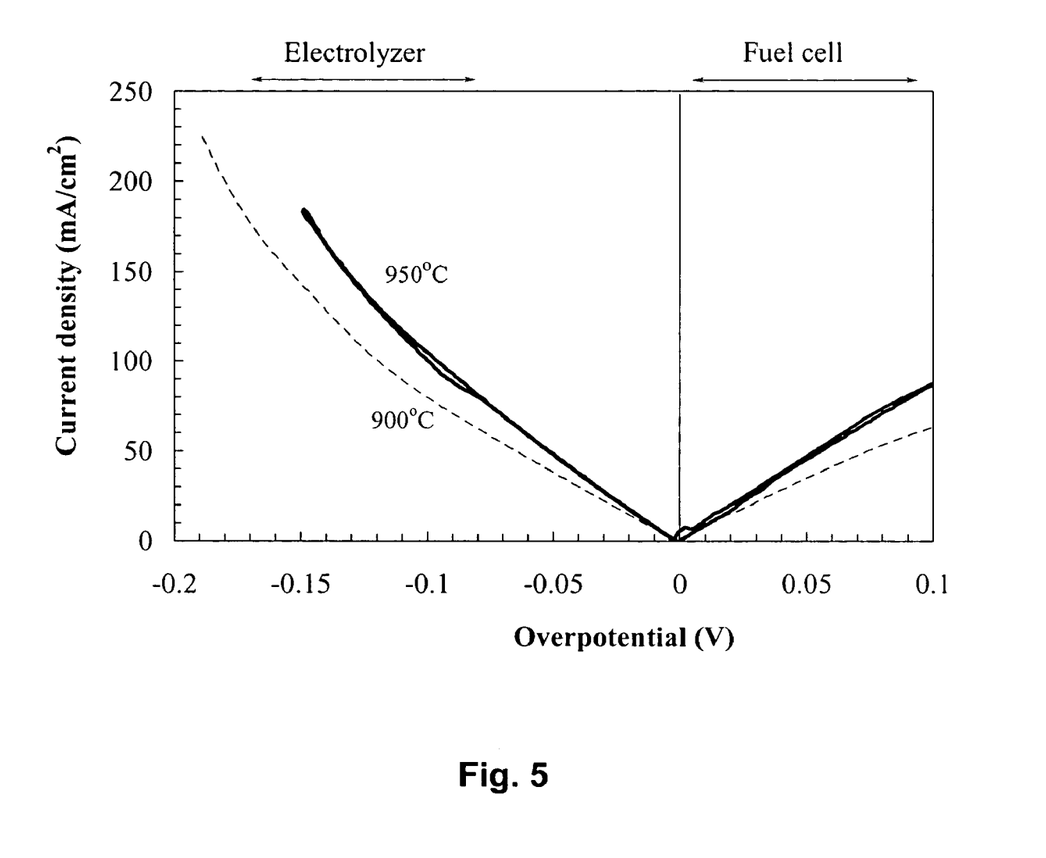
FIG. 5 is a plot showing current-overpotential dependencies obtained on a ceramic composite $La_{0.35}Sr_{0.65}TiO_3 + Ce_{0.99}Nb_{0.01}O_{2-\delta}$ at 900° C. and 950° C.

Higher operating temperatures resulted in lower polarization losses for titanate/ceria composite electrodes in both electrolyzer and fuel cell modes. Current-overpotential dependencies obtained for an electrode composed of $La_{0.35}Sr_{0.65}TiO_3$—$Ce_{0.99}Nb_{0.01}O_{2-\delta}$ in a 5:5 mole ratio at 900° C. and 950° C. are given in FIG. 5. The area specific resistances in the electrolyzer mode were 1.3 and 1.0 ohms-cm$^2$, respectively, at 900° C. and 950° C. for a polarization loss of 0.1 V. In the fuel cell mode, area specific resistances were 1.5 and 1.1 ohms-cm$^2$, respectively.

Figure 6:
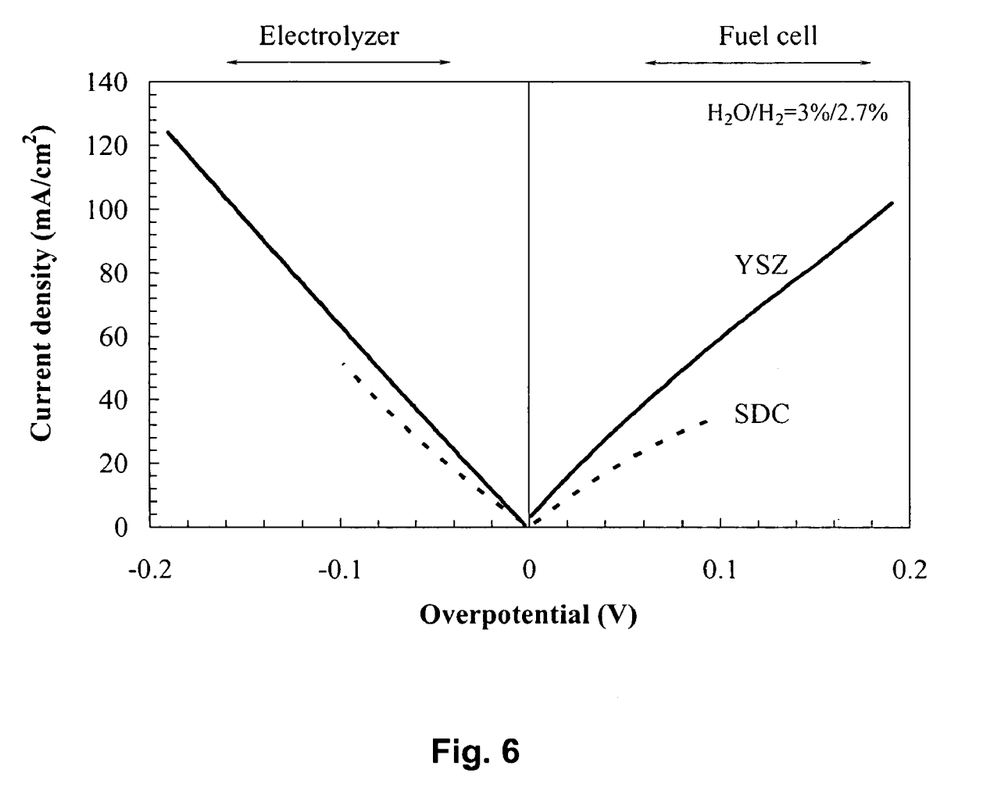
FIG. 6 is a plot showing current-overpotential dependencies obtained at 900° C. on a ceramic composite $La_{0.35}Sr_{0.65}TiO_3 + Ce_{0.98}Ta_{0.02}O_{2-\delta}$ deposited on YSZ electrolytes and at 650° C. on a composite deposited on SDC electrolyte.

Polarization losses were significantly lowered by replacing the YSZ electrolyte with samaria-doped cerium oxide (SDC), in both electrolyzer and fuel cell modes. For example, a titanate/ceria composite electrode ($La_{0.35}Sr_{0.65}TiO_3$—$Ce_{0.98}Ta_{0.02}O_{2-\delta}$ in a 7:3 mole ratio) operated at 900° C. gave similar polarization losses at 650° C. when deposited on a SDC $Ce_{0.9}Sm_{0.1}O_{2-\delta}$ electrolyte, as shown in FIG. 6.

It is evident that various modifications, additions or deletions could be incorporated in the system and method of the present invention without departing from the basic teachings thereof. Also, the various elements and steps described herein are exemplary of an embodiment which is presently considered to be a preferred embodiment, and these are to be interpreted to include equivalents thereof.

We claim:

1. An electrode in a solid oxide fuel cell comprising a two-phase mixture having:
   a first phase of doped strontium titanate of the general formula $Sr_{1-x}M_xTiO_{3-\delta}$, where M is selected from a group consisting of yttrium, scandium, lanthanum, and combinations thereof, wherein x may vary typically from 0.01 to 0.5, and wherein $\delta$ is indicative of some degree of oxygen non-stoichiometry; and
   a second phase of donor-doped cerium oxide of the general formula $N_yCe_{1-y}O_{2-\delta}$, where N is niobium (Nb), vanadium (V), antimony (Sb) tantalum (Ta), or combinations thereof, and where "y" may vary typically from 0.001 to 0.1; and
   wherein the electrode is an oxide substantially without a metal phase and the ratio of Ti in said first phase to the sum of Ce and N in said second phase is from about 0.2 to about 0.75.

2. The electrode of claim 1 wherein said two phases further form percolating networks through said electrode.

3. The electrode of claim 1 wherein the electrocatalytic properties of said two-phase mixture exceed the electrocatalytic properties of said first phase and said second phase.

4. The electrode of claim 1 wherein said cerium oxide is doped with a pentavalent cation.

5. The electrode in claim 1 wherein said first phase doped strontium titanate further comprises of at least one member selected from the group consisting of nickel, cobalt, copper, chromium and iron.

* * * * *